(12) United States Patent
Alvarez

(10) Patent No.: US 10,780,824 B1
(45) Date of Patent: Sep. 22, 2020

(54) SAFETY ACCESSORY FOR VEHICLES

(71) Applicant: Elizabeth Alvarez, Hialeah Gardens, FL (US)

(72) Inventor: Elizabeth Alvarez, Hialeah Gardens, FL (US)

( * ) Notice: Subject to any disclaimer, the term of this patent is extended or adjusted under 35 U.S.C. 154(b) by 0 days.

(21) Appl. No.: 16/283,000

(22) Filed: Feb. 22, 2019

(51) Int. Cl.

| | |
|---|---|
| *B60R 11/04* | (2006.01) |
| *B60Q 9/00* | (2006.01) |
| *B60Q 1/50* | (2006.01) |
| *B60Q 1/22* | (2006.01) |
| *B60Q 1/44* | (2006.01) |
| *B60Q 5/00* | (2006.01) |
| *H04N 5/225* | (2006.01) |
| *H04N 7/04* | (2006.01) |
| *G01S 19/13* | (2010.01) |
| *B60R 1/00* | (2006.01) |
| *B60R 11/00* | (2006.01) |

(52) U.S. Cl.
CPC .............. *B60Q 9/00* (2013.01); *B60Q 1/22* (2013.01); *B60Q 1/44* (2013.01); *B60Q 1/50* (2013.01); *B60Q 5/00* (2013.01); *B60R 1/00* (2013.01); *B60R 11/04* (2013.01); *G01S 19/13* (2013.01); *H04N 5/2252* (2013.01); *H04N 7/04* (2013.01); *B60R 2011/004* (2013.01); *B60R 2300/8066* (2013.01); *B60Y 2200/148* (2013.01)

(58) Field of Classification Search
CPC ... B60Q 9/00; B60Q 1/22; B60Q 1/44; B60Q 1/50; B60Q 5/00; B60R 11/04; B60R 2011/004; B60R 2300/8066; G01S 19/13; H04N 5/2252; H04N 7/04; B60Y 2200/148
See application file for complete search history.

(56) References Cited

U.S. PATENT DOCUMENTS

| | | | |
|---|---|---|---|
| 2014/0375807 A1* | 12/2014 | Muetzel | H04N 7/18 348/148 |
| 2017/0021768 A1* | 1/2017 | Jaegal | B60Q 1/525 |
| 2017/0282800 A1* | 10/2017 | Haen | B60R 1/00 |
| 2018/0056784 A1* | 3/2018 | Virgilio | G07C 5/085 |
| 2019/0217769 A1* | 7/2019 | Nekic | B60Q 1/448 |

\* cited by examiner

*Primary Examiner* — Nasser M Goodarzi
*Assistant Examiner* — Patrick A Ryan
(74) *Attorney, Agent, or Firm* — Sanchelima & Associates, P.A.; Christian Sanchelima; Jesus Sanchelima

(57) ABSTRACT

The present invention is disclosing a safety accessory for vehicles. Safety accessory comprises a housing mounted on rear side of a trailer of vehicle. Housing comprises an image capturing device configured to capture a view towards rear side of trailer. Housing further comprises a set of safety lights and a set of speakers configured to render visual and audio signals respectively, based on captured view, a global positioning system (GPS) tracker configured to record location of vehicle at continuous time stamps. Housing further comprises a transceiver configured to communicate at least captured view, audio signals, and a location of trailer to one or more remote devices via a wireless communication network.

12 Claims, 2 Drawing Sheets

US 10,780,824 B1

SAFETY ACCESSORY FOR VEHICLES

BACKGROUND OF THE INVENTION

1. Field of the Invention

The present disclosure relates to a safety accessory. More particularly, the present disclosure relates to a safety accessory that may be used in vehicles.

2. Description of the Related Art

A variety of safety devices are incorporated in vehicles, specifically heavy duty commercial tractor-trailers. Such safety devices are of a great assistance to the drivers for handling such heavy duty commercial tractor-trailers in a safest possible manner.

Several designs of safety devices have been presented in the past. None of them, however, presents a simple and safety accessory that is user friendly, simple to use, effective, adaptable, and a great safety accessory that increases safety while reversing and driving tractor-trailers.

Applicant believes that a related reference corresponds to US patent application number US20180056784A1 filed by Savino Virgilio that discloses a safety and emergency-assistance system for vehicles, constituted by at least one bracelet, a means for radio/telecommunication of the alarm signal, a black box, a plurality of sensors, and means for remote automatic driving and management of the vehicle. In the case of emergency, with the driver/passenger present and unwell while the vehicle is stationary with the engine off and without the key inserted into the ignition, or with the key inserted and the instrument panel off. The system also enables automatic and autonomous activation of the devices present on board the vehicle, e.g. airbags, power window, and air-conditioning system. However, such system is very complex and demands an established infrastructure for implementation.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a safety accessory, comprising a safety accessory for vehicles. Safety accessory may comprise a housing mounted on rear side of a trailer of vehicle. Housing may comprise an image capturing device configured to capture a view towards rear side of trailer, a set of safety lights and a set of speakers configured to render visual and audio signals respectively, based on captured view, a global positioning system (GPS) tracker configured to record location of vehicle at continuous time stamps, and a transceiver configured to communicate at least captured view, audio signals, and a location of trailer to one or more remote devices via a wireless communication network.

Housing may further comprise a set of fastening members configured to mount housing on rear side of trailer, a control switch configured to control one of set of safety lights, and one or more sensors configured to detect one or more events within a defined proximity distance of vehicle. Set of safety lights may comprise a yellow strobe light configured to indicate stop breaks as a warning, a white light configured to indicate back-up warning of vehicle, and a red light configured to indicate stop or marker warning.

In accordance with an embodiment, communication network may be one of a long distance communication network or a short distance communication network. GPS tracker in safety accessory may be synchronized with a GPS navigation application installed in a mobile device of a user associated with at least one of one or more remote devices. Housing may further comprise a rechargeable battery configured to supply power to image capturing device, set of safety lights and speakers, GPS tracker, transceiver, and one or more sensors.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
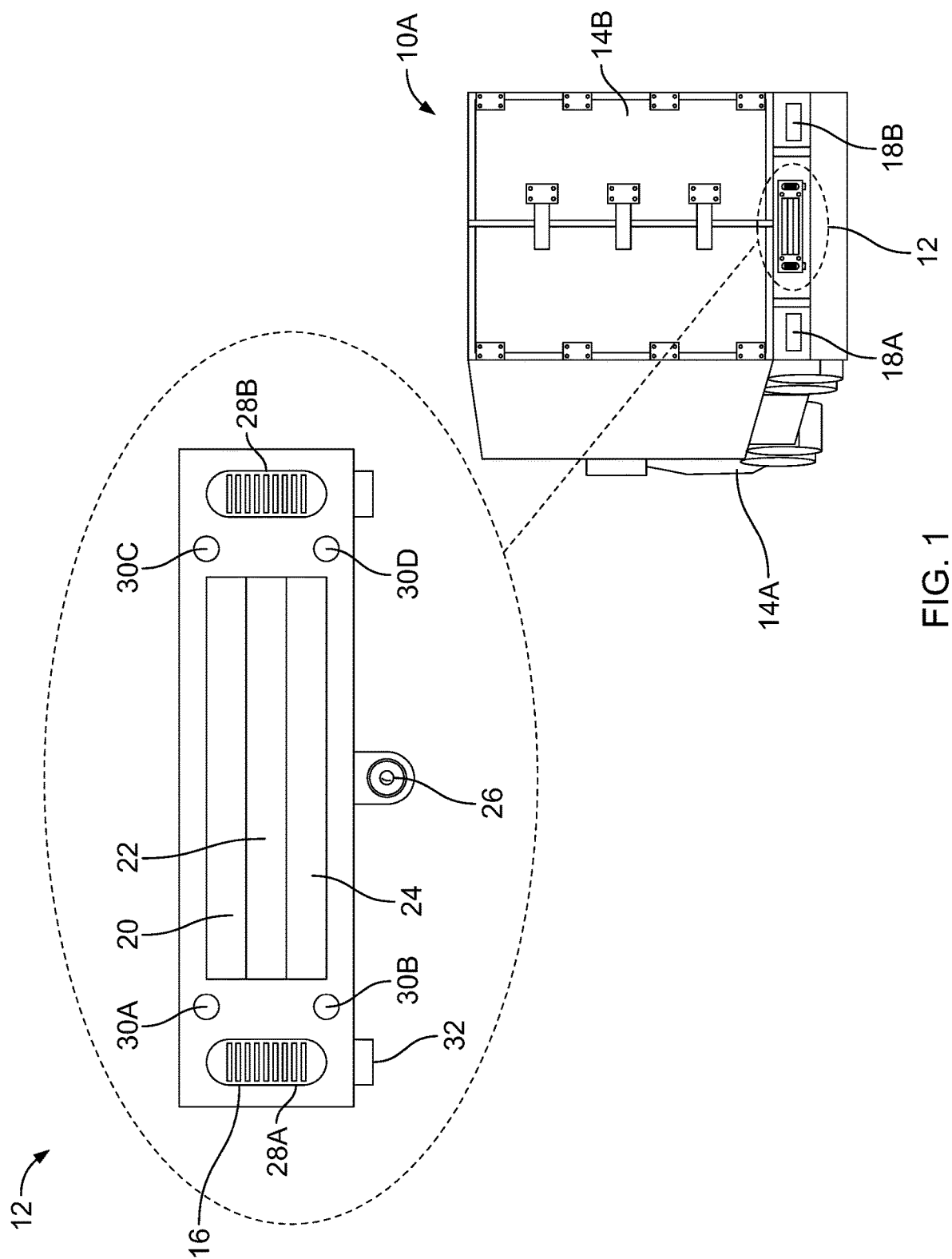
FIG. 1 represents a safety accessory 12 of present invention in its first view 10A of an operating environment, according to an embodiment described herein.

Referring now to the drawings, FIGS. 1-3, where the present invention is generally referred to with numeral 12, it can be observed that a safety accessory, in accordance with one embodiment, is provided that includes various components, a described hereinafter.

FIG. 1 represents a safety accessory 12 of present invention in its first view 10A of an operating environment; FIG. 2 represents a block diagram of safety accessory 12 of present invention; and FIG. 3 represents safety accessory 12 of present invention in its second view 10B of operating environment, according to an embodiment described herein.

Figure 2:
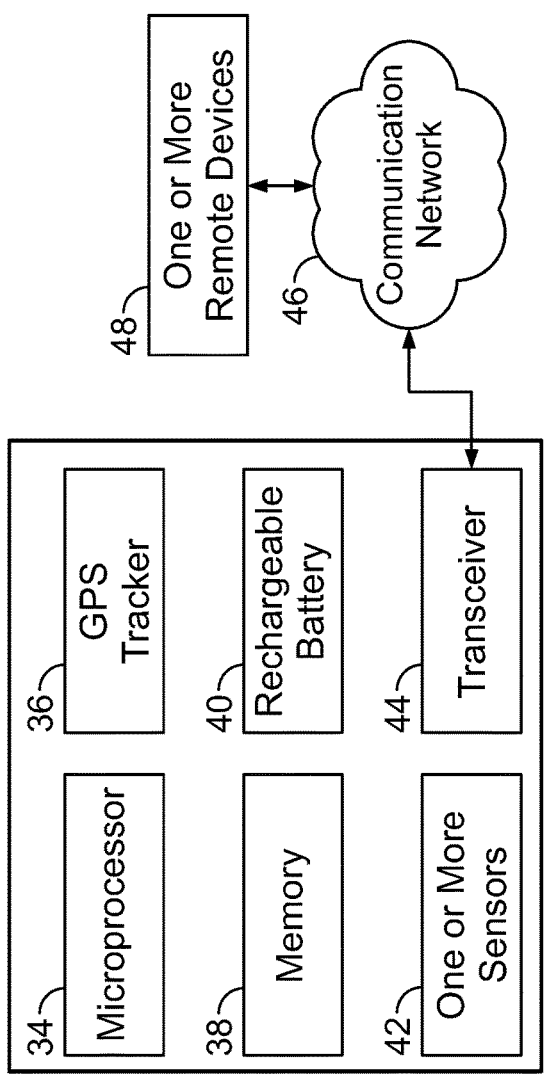
FIG. 2 represents a block diagram of safety accessory 12 of present invention, according to an embodiment described herein
Figure 3:
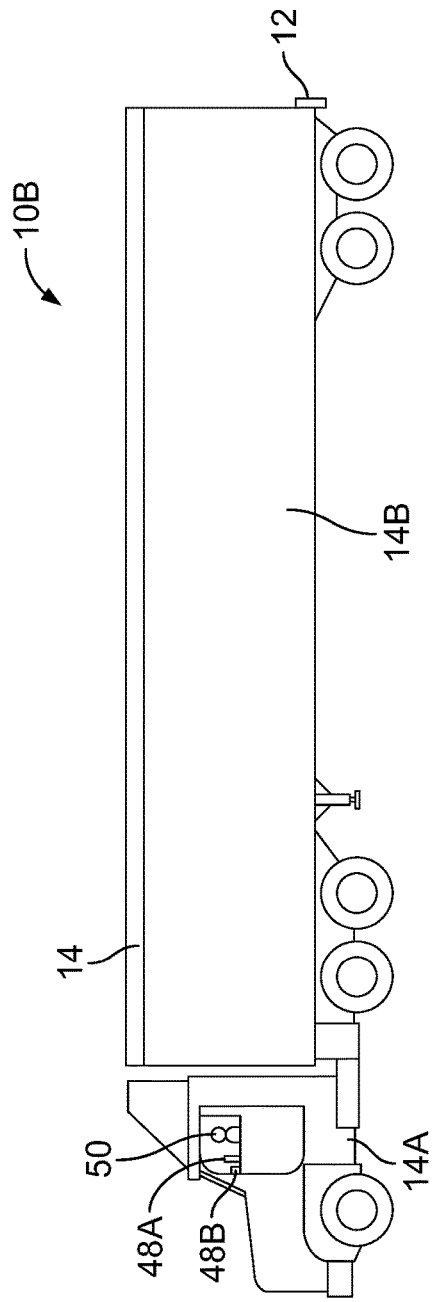
FIG. 3 represents safety accessory 12 of present invention in its second view 10B of operating environment, according to an embodiment described herein.

FIGS. 1-3 collectively illustrate safety accessory 12, a trailer 14B coupled with a tractor 14A of a vehicle 14, a housing 16, tail lights 18A and 18B, a set of safety lights (20, 22, and 24), an image capturing device 26, a set of speakers (28A and 28B), a set of fastening members (30A, 30B, 30C, and 30D), a control switch 32, a microprocessor 34, a global positioning system (GPS) tracker 36, a memory 38, a rechargeable battery 40, one or more sensors 42, a transceiver 44, a communication network 46, one or more remote devices 48, such as mobile device 48A of a driver 50, or dash screen 48B of vehicle 14.

Safety accessory 12 may include a housing 16 mounted on rear side of trailer 14B coupled with tractor 14A of vehicle 14.

Housing 16 further comprises set of safety lights (20, 22, and 24) and set of speakers (28A and 28B) configured to render visual and audio signals respectively, based on captured view. Set of safety lights (20, 22, and 24) may comprise a yellow strobe light 20 configured to indicate stop breaks as a warning, a white light 22 configured to indicate back-up warning of vehicle 14, and a red light 24 configured to indicate stop or marker warning.

Housing 16 may comprise image capturing device 26, such as a video camera, configured to capture a view towards rear side of trailer 14B. Image capturing device 26 may be a waterproof, high-definition, night-vision video camera with impact sensors and are Wi-Fi compatible.

Housing 16 may further comprise set of fastening members (30A, 30B, 30C, and 30D) configured to mount housing 16 on rear side of trailer 14B. Such fastening members (30A, 30B, 30C, and 30D) may receive screws, nuts and bolts, or other such fastening mechanisms to mount housing 16 between tail lights 18A and 18B on rear side of trailer 14B.

Housing 16 may further comprise control switch 32 configured to control one of set of safety lights (20, 22, and 24), such as yellow strobe light 20. In accordance with an embodiment, control switch 32 may be a three-position switch to control yellow strobe light 20, for example, 1-off, 2-stop on, and 3-strobe on.

Housing 16 may further comprise microprocessor 34 configured to perform analysis of signals generated by one or more sensors 42, determine severity level of one or more events, generate one or more emergency notifications, alert signals, and/or warnings, and activate plurality of electronic units, such as set of speakers 28A and 28B that render one or more emergency notifications, alert signals, and/or warnings. Microprocessor 34 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

Housing 16 may further comprise GPS tracker 36 configured to record location of vehicle 14 at continuous time stamps. GPS tracker 36 in safety accessory 12 may be synchronized with a GPS navigation application installed in a mobile device of a user associated with at least one of one or more remote devices, coupled with safety accessory 12 via a wireless network. GPS tracker 36 may be a navigation device, and may use global positioning system to track movements of vehicle 14. GPS tracker 36 may receive location information from a location sensor of safety accessory 12, and such location information may be displayed against a map backdrop in real time, using GPS tracking software installed at a remote device, such as mobile device 48A of driver 50 of vehicle 14. In an embodiment, GPS tracker 36 in safety accessory 12 may be synchronized with a GPS navigation application installed in mobile device 48A of driver 50 of vehicle 14.

Housing 16 may further comprise memory 38 that may be configured to temporarily store various data, such as location of vehicle 14 at continuous time stamps, complete trip data and intermediate stopping location of vehicle 14 during defined time duration, such as a day, rendering pattern of warning signals, and plurality of pre-recorded voice messages that may be retrieved by microprocessor 34.

Housing 16 may further comprise a rechargeable battery 40 configured to supply power to image capturing device 26, set of safety lights (20, 22, and 24) and speakers (28A and 28B), GPS tracker 36, transceiver 44, and one or more sensors 42. In an embodiment, rechargeable battery 40 may be charged from an external power supply via a power cable (not shown) when power level drops below a threshold power level. In an embodiment, rechargeable battery 40 may be lithium-ion batteries that are small, durable, and having long life.

Housing 16 may further comprise one or more sensors 42, such as smoke sensor, contact sensor, proximity sensor, motion sensor, accelerometer, audio sensor, location tracker, or pressure sensor, and the like, configured to detect one or more events within a defined proximity distance of vehicle 14. Such one or more events may include an impact of another vehicle 14 with trailer 14B, continuous honking of other vehicle, another vehicle approaching very fast towards rear of trailer 14B, any possible impact that may happen, and the like. Generated signal may cause microprocessor 34 to activate, for example, at least a set of devices, based on detected event.

Housing 16 may further comprise transceiver 44 configured to communicate at least captured view, audio signals, and location of trailer 14B to one or more remote devices via wireless communication network 46. Communication network 46 may be one of a long distance communication network or a short distance communication network.

One or more remote devices 48, such as mobile device 48A of driver 50 of vehicle 14, may be devices that may communicate with safety accessory 12 via wireless communication network 46. One or more remote devices 48 may further include portable devices, such as phones, desktops, tablets, or laptops, associated with other drivers, a medical team, an emergency rescue team, or a police team, in case of an emergency situation.

In operation, image capturing device 26 may capture a view towards rear side of trailer 14B. One or more sensors 42 may detect one or more events, such as an over-speeding vehicle approaching vehicle 14, within a defined proximity distance of vehicle 14. Accordingly, set of safety lights (20, 22, and 24) and a set of speakers (28A and 28B) may render visual and audio signals respectively, based on captured view and/or detected one or more events. GPS tracker 36 may record location of vehicle 14 at continuous time stamps. Transceiver 44 may communicate at least captured view, audio signals, and a location of vehicle 14 to one or more remote devices 48, such as mobile device 48A of driver 50 or dash screen 48B of vehicle 14 or other drivers in other vehicles in vicinity, via wireless communication network 46.

Safety accessory 12 may provide various advantages, such as minimizing accidents, thus insurance claims, and maximizing alertness of drivers in surrounding vehicles. Specifically, safety accessory 12 provides an effective way to increase safety while reversing and driving trailer 14B. For example, set of safety lights (20, 22, and 24) include lighting members that provide other drivers or pedestrians with different alerts such as strobe signal for oversized loads, city lights, backup light to notify about reversing, an intermittent yellow brake light, a video camera to allow driver to see hazards and vehicles from behind, and audible warnings about movement of vehicle 14. Communication with other drivers may be improved based on latest technologies. Other advantages are: preventing accidents, added peace of mind, and easy to install and use. In accordance with an exemplary embodiment, height of safety accessory 12 may be 4", length may be 14", and width may be 1". Shape of safety accessory 12 may be rectangular or other such shape. Memory 38 records every event and continuous locations in real-time with respect to vehicle 14.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A safety accessory, comprising:
    a vehicle including a tractor and a trailer, said tractor leading said trailer, a housing mounted on a rear side of said trailer of said vehicle;
        an image capturing device mounted entirely beneath said housing, said image capturing device extending outwardly and away from said housing, said image capturing device configured to capture a view towards said rear side of said trailer;
        a set of safety lights and a set of speakers mounted on said housing, said set of safety lights being centrally mounted on said housing, said set of safety lights being in constant abutting contact with each other, said set of safety lights and said set of speakers configured to render visual and audio signals respectively, based on said captured view;
        a global positioning system (GPS) tracker mounted on said housing and configured to record location of said vehicle at continuous time stamps; and
        a transceiver mounted on said housing and configured to communicate at least said captured view, said audio signals, and a location of said trailer to one or more remote devices via a wireless communication network.

2. The safety accessory of claim 1, wherein said housing further includes a set of fastening members to mount and secure said housing on said rear side of said trailer.

3. The safety accessory of claim 1, wherein said housing further includes a control switch entirely underneath of said housing, said control switch being parallel to said image capturing device, said control configured to control at least one of said set of safety lights.

4. The safety accessory of claim 1, wherein said set of safety lights includes a yellow strobe light configured to indicate stop breaks as a warning, a white light configured to indicate back-up warning of said vehicle, and a red light configured to indicate stop or marker warning.

5. The safety accessory of claim 1, wherein said housing includes one or more sensors configured to detect one or more events within a defined proximity distance of said vehicle.

6. The safety accessory of claim 1, wherein said communication network is one of a long distance communication network or a short distance communication network.

7. The safety accessory of claim 1, wherein said GPS tracker in said safety accessory is synchronized with a GPS navigation application installed in a mobile device of a user associated with at least one of said one or more remote devices.

8. The safety accessory of claim 1, further includes a rechargeable battery configured to supply power to said image capturing device, said set of safety lights and speakers, said GPS tracker, said transceiver, and one or more sensors.

9. The safety accessory of claim 1, wherein said set of safety lights are parallel to each other and vertically in line with each other.

10. The safety accessory of claim 1, wherein said set of safety lights extend horizontally across said housing.

11. The safety accessory of claim 1, wherein said set of safety lights being between said set of speakers, said set of speakers extending vertically on said housing, said set of safety lights and said set of speakers being perpendicular to each other.

12. The safety accessory of claim 1, wherein said housing partially extends below said trailer.

* * * * *